US 9,657,832 B2

(12) United States Patent
Ricker

(10) Patent No.: US 9,657,832 B2
(45) Date of Patent: May 23, 2017

(54) STEERING RACK WEAR COMPENSATOR ASSEMBLY

(71) Applicant: Cory R. Ricker, Hemlock, MI (US)

(72) Inventor: Cory R. Ricker, Hemlock, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 418 days.

(21) Appl. No.: 13/792,581

(22) Filed: Mar. 11, 2013

(65) Prior Publication Data

US 2014/0251035 A1 Sep. 11, 2014

(51) Int. Cl.
*F16H 57/12* (2006.01)
*F16H 19/04* (2006.01)
*B62D 3/12* (2006.01)
*F16H 55/28* (2006.01)

(52) U.S. Cl.
CPC ............ *F16H 57/12* (2013.01); *B62D 3/123* (2013.01); *F16H 19/04* (2013.01); *F16H 55/283* (2013.01); *Y10T 74/18096* (2015.01); *Y10T 74/19623* (2015.01)

(58) Field of Classification Search
CPC ... B62D 3/123; Y10T 74/19623; F16H 55/28; F16H 55/283; F16H 2055/281; F16H 57/12
See application file for complete search history.

(56) References Cited

U.S. PATENT DOCUMENTS

| 6,119,540 | A | 9/2000 | Phillips | |
|---|---|---|---|---|
| 6,142,031 | A | 11/2000 | Phillips | |
| 7,487,984 | B1 * | 2/2009 | Lemont, Jr. ............ | B62D 3/123 280/93.514 |
| 7,614,317 | B2 * | 11/2009 | Sickert et al. ................. | 74/422 |
| 8,327,731 | B2 * | 12/2012 | Sung ...................... | B62D 3/123 74/388 PS |
| 8,418,576 | B2 * | 4/2013 | Bareis ............................ | 74/422 |
| 8,443,689 | B2 * | 5/2013 | Kawakubo ............. | B62D 3/123 74/422 |
| 8,752,445 | B2 * | 6/2014 | Bareis ................... | B62D 3/123 74/388 PS |

(Continued)

FOREIGN PATENT DOCUMENTS

| CN | 101402371 A | 4/2009 |
|---|---|---|
| CN | 102826114 A | 12/2012 |

(Continued)

OTHER PUBLICATIONS

European Search Report for related European Patent Application No. 14156991.3; dated May 14, 2014; 11 pages.

(Continued)

*Primary Examiner* — William C Joyce
(74) *Attorney, Agent, or Firm* — Cantor Colburn LLP

(57) ABSTRACT

A wear compensator assembly configured for exerting a predetermined biasing force on a rack and a pinion shaft of a steering gear assembly is disclosed. The wear compensator assembly includes a cam member having a seating surface and a biasing member seated against the seating surface of the cam member. The biasing member is configured to be compressed by a predetermined amount and to exert the predetermined biasing force.

19 Claims, 5 Drawing Sheets

(56) References Cited

U.S. PATENT DOCUMENTS

| | | | |
|---|---|---|---|
| 8,794,093 B2* | 8/2014 | Bareis | B62D 3/123 74/388 PS |
| 8,899,119 B2* | 12/2014 | Bareis | B62D 3/123 74/409 |
| 2007/0209463 A1* | 9/2007 | Song et al. | 74/388 PS |
| 2012/0318085 A1* | 12/2012 | Park | 74/409 |
| 2013/0047763 A1 | 2/2013 | Bareis | |
| 2013/0091979 A1* | 4/2013 | Bareis | B62D 3/123 74/568 R |

FOREIGN PATENT DOCUMENTS

| | | | |
|---|---|---|---|
| DE | 102009019189 A1 | | 11/2010 |
| DE | 10 2009 046 304 | * | 5/2011 |
| DE | 102010012742 A1 | | 9/2011 |
| EP | 2098435 A2 | | 9/2009 |
| EP | 2098435 A3 | | 9/2011 |

OTHER PUBLICATIONS

European Office Action for EP Application No. 14156991.3 dated Nov. 12, 2015.
Chinese Office Action for CN Application No. 201410087106 dated Jan. 4, 2016.

\* cited by examiner

STEERING RACK WEAR COMPENSATOR ASSEMBLY

BACKGROUND OF THE INVENTION

The present invention relates to a wear compensator assembly, and more particularly to a wear compensator assembly including a biasing member for exerting a biasing force to urge a rack into engagement with a pinion shaft.

Rack and pinion steering systems may have some type of mechanism for biasing the rack securely against the pinion shaft. One type of biasing mechanism is a wear compensator assembly. The biasing is performed in order to substantially reduce the potential for rattling and other types of noise, vibration, and harshness (NVH) created by the steering system. The rattling may arise due to wear in the steering system components. For example, during operation the rack and the pinion shaft may wear, which in turn leads to rattling. The wear compensator assembly is used to bias the rack against the pinion shaft gear.

Some types of wear compensator assemblies tend to include numerous components. For example, one type of wear compensator assembly may include an adjuster plug, separate upper and lower cams, damping grease, a torsion spring, a spring, a compression plate, a nut (with pre-applied adhesive) and pins. Numerous parts may add cost and complexity to the wear compensator assembly. Moreover, a pre-loading operation to load the spring may be required before the wear compensator is assembled to the steering system. The pre-loading operation compresses the spring between the compression plate and a surface of the lower cam.

SUMMARY OF THE INVENTION

In one embodiment, wear compensator assembly configured for exerting a predetermined biasing force on a rack and a pinion shaft of a steering gear assembly is disclosed. The wear compensator assembly includes a cam member having a seating surface and a biasing member seated against the seating surface of the cam member. The biasing member is configured to be compressed by a predetermined amount and to exert the predetermined biasing force.

In another embodiment, a steering gear assembly is disclosed. The steering gear assembly includes a rack, a pinion shaft, a rack shoe, and a wear compensator assembly. The rack shoe has a rack shoe seating surface and is seated against the rack. The wear compensator assembly is configured for exerting a predetermined biasing force on the rack and the pinion shaft. The wear compensator includes a cam member having a cam seating surface and a biasing member. The biasing member is compressed by a predetermined amount between the cam seating surface of the cam member and the rack shoe seating surface. The biasing member is configured to exert the predetermined biasing force on the rack shoe.

In yet another embodiment, a steering gear assembly is disclosed. The steering gear assembly includes a rack, a pinion shaft, a rack shoe, and a wear compensator assembly. The rack shoe has a rack shoe seating surface and is seated against the rack. The wear compensator assembly is configured for exerting a predetermined biasing force on the rack and the pinion shaft. The wear compensator includes a cam member having a cam seating surface, an adjuster plug, and a biasing member. An adjuster plug includes at least one adjuster plug camming surface that is engaged with at least one camming surface of the cam member. The biasing member is compressed by a predetermined amount between the cam seating surface of the cam member and the rack shoe seating surface. The biasing member is configured to exert the predetermined biasing force on the rack shoe.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
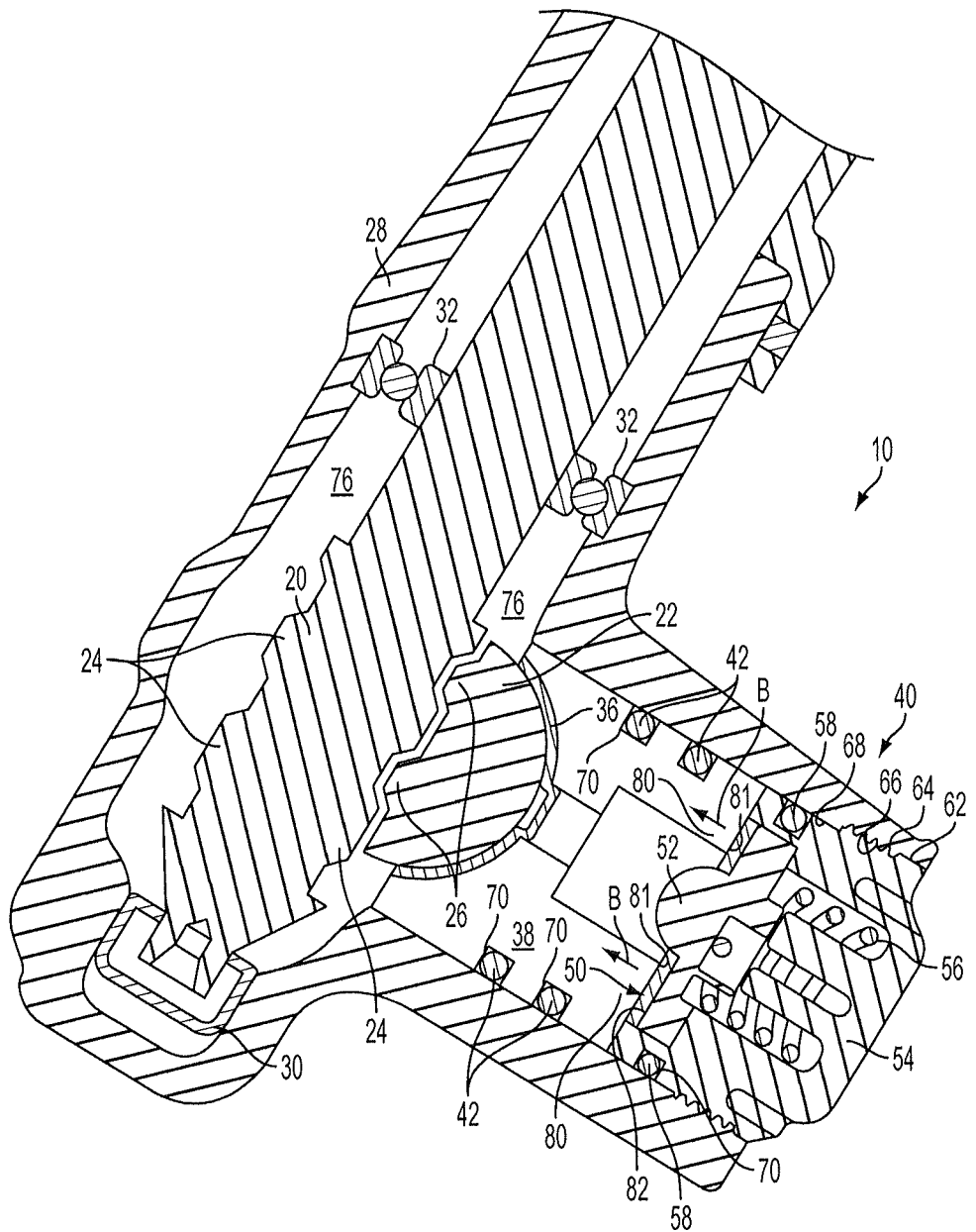
FIG. 1 is a cross-sectioned view of a steering system in accordance with an exemplary embodiment of the invention.

Referring now to the Figures, where the invention will be described with reference to specific embodiments, without limiting same, an exemplary steering gear assembly 10 is shown including a pinion shaft 20 that is meshingly engaged with a rack 22. Specifically, the pinion shaft 20 includes a plurality of pinion teeth 24 that are meshingly engaged with a plurality of rack teeth 26. A housing 28 is provided for partially containing the pinion shaft 20 and the rack 22. The pinion shaft 20 is rotatably supported within the housing 28 by bearings 30 and 32. The steering gear assembly 10 also includes a bearing liner 36, a rack shoe 38, and a wear compensator assembly 40. The rack shoe 38 is seated against the rack 22. The bearing liner 36 is located between the rack 22 and the rack shoe 38, and is used to reduce the frictional resistance between the rack 22 and the rack shoe 38. The rack shoe 38 may include one or more O-rings 42 located between the rack shoe 38 and the housing 28. The wear compensator assembly 40 includes a biasing member 50, a lower cam 52, an adjuster plug 54, a torsion biasing member 56, and an O-ring 58. It should be noted that while a rack and pinion type steering assembly is shown in FIG. 1, the wear compensator assembly 40 may be used in other types of steering applications as well.

Figure 2:
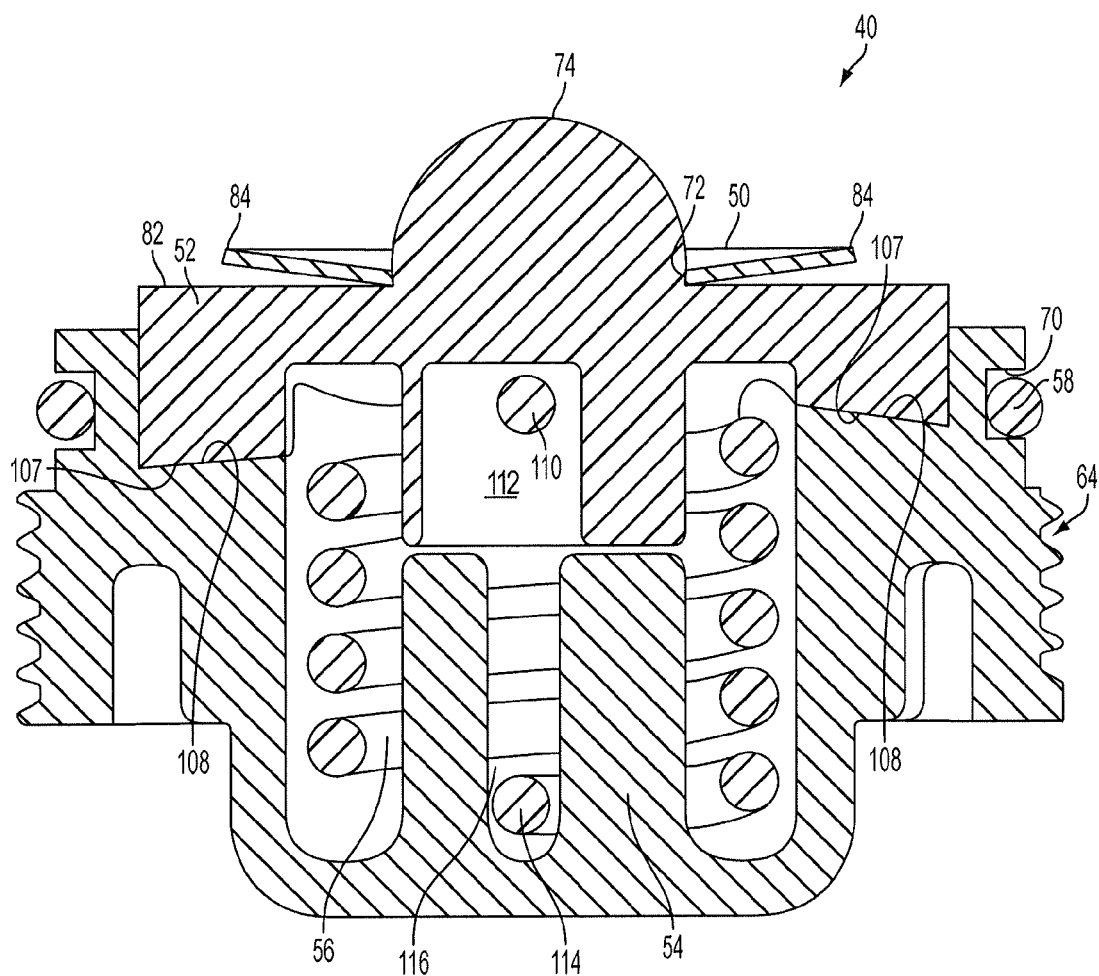
FIG. 2 is an illustration of an exemplary wear compensator assembly including a biasing member in accordance with another embodiment of the invention.

The adjuster plug 54 includes an outer surface 62 having a plurality of threads 64 that are threadingly engaged with threads 66 located along an inner surface 68 of the housing 28, which fixedly secures the adjuster plug 54 to the housing 28. In one embodiment, the threads 64 on the adjuster plug 54 are mechanically staked with the threads 66 of the housing 28. Mechanical staking may include, for example, plastically deforming the threads 64 on the adjuster plug 54 with the threads 66 of the housing 28. The O-ring 58 is received within an annular groove 70 located within the adjuster plug 54 (the O-ring 58 and the annular groove 70 are also shown in FIG. 2). The O-ring 58 acts as a seal to generally prevent the ingression of contaminants into an interior portion 76 of the housing 28. In one embodiment, tolerances between the threads 64 on the adjuster plug 54 and the threads 66 of the housing 28 may be increased or relaxed, as the O-ring 58 may be used to provide sealing and generally prevent ingression of contaminants into the housing 28. Moreover, in some embodiments adhesive (not shown) that is typically provided between the threads 64 on the adjuster plug 54 and the threads 66 of the housing 28 for sealing may be omitted as well. Instead, the O-ring 58 provides sealing.

The biasing member 50 is located between the lower cam 52 and the rack shoe 38. A portion 80 of the rack shoe 38 abuts against the biasing member 50, thereby compressing the biasing member 50 against a seating surface 82 of the lower cam 52. When compressed by the rack shoe 38, the biasing member 50 exerts a biasing force B in an axial direction towards the rack shoe 38. The biasing force B urges the rack shoe 38 against the rack 22. The biasing force B also urges the rack 22 into engagement with the pinion shaft 20. Specifically, the biasing force B is a predetermined force that is selected to urge the rack teeth 26 of the rack 22 into engagement with the pinion teeth 24 of the pinion shaft 20.

FIG. 2 is an illustration of the biasing member 50 in a relaxed or unloaded position. The biasing member 50 includes an aperture or opening 72. The lower cam 52 includes a generally dome-shaped protrusion 74 projecting outwardly from the seating surface 82, where the aperture 72 of the biasing member 50 is received by the protrusion 74. In one embodiment, the biasing member 50 may be a Belleville-type or slotted spring, however it is to be understood that other types of biasing members may be used as well. The biasing member 50 includes an outer perimeter 84 that flares or is biased towards the rack shoe 38 (FIG. 1) when the biasing member 50 is in a relaxed or unloaded position.

Figure 3:
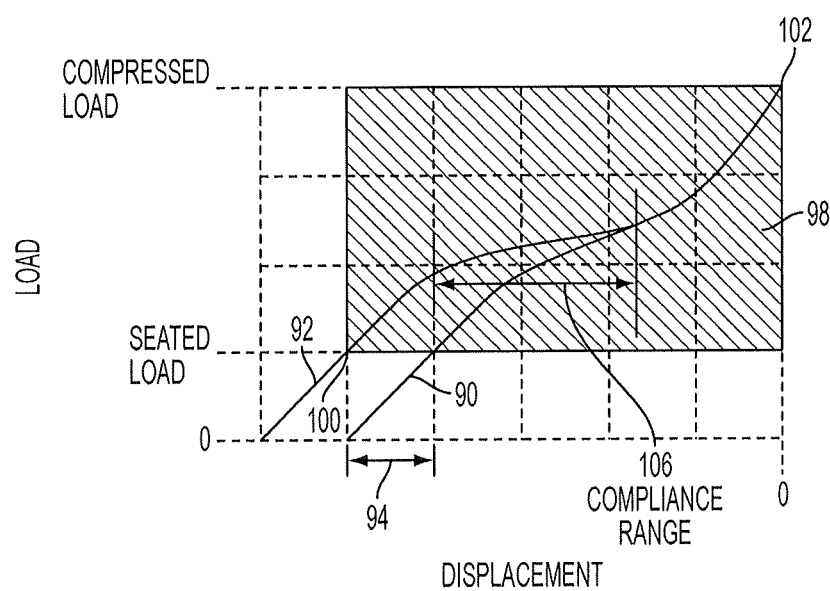
FIG. 3 is an exemplary load-displacement curve of the biasing member shown in FIG. 2 in accordance with yet another embodiment of the invention.

Referring now to FIGS. 1-2, during assembly of the steering system 10 the biasing member 50 is compressed against a seating surface 81 of the rack shoe 38 and the seating surface 82 of the lower cam 52 by a predetermined amount. The adjuster plug 54 is fixedly attached to the housing 28, which in turn positions and compresses the biasing member 50 against the rack shoe 38 by the predetermined amount. The compression of the biasing member 50 by the predetermined amount results in a predefined amount of load (e.g., the biasing force B) exerted on the rack 22 and pinion shaft 20. The biasing member 50 includes specific load-displacement characteristics that allow the biasing member 50 to exert the predefined amount of load based on the biasing member 50 being compressed or displaced by a specific amount. FIG. 3 is an exemplary load displacement graph of the biasing member 50. It should be noted that the load displacement graph as shown in FIG. 3 is merely exemplary in nature, and that other load-displacement graphs may be used as well.

The load-displacement graph includes a first load-displacement curve 90 which represents the least amount of loading the biasing member 50 may experience based on a specific displacement, and a second load-displacement curve 92 which represents the greatest amount of loading the biasing member 50 may experience based on the specific displacement. Referring now to FIGS. 1-3, the load-displacement graph includes a displacement requirement region 94, which represents an amount of target compression or negative displacement the biasing member 50 may experience during assembly of the biasing member 50 between the rack shoe 38 and the lower cam 52 (e.g., the amount of compression or displacement the biasing member 50 undergoes as the portion 80 of the rack shoe 38 abuts against the biasing member 50 as shown in FIG. 2). The displacement requirement region 94 may range from about −0.01 millimeters to about −0.1 millimeters, depending on the specific application. The load-displacement graph includes a shaded portion 98 which represents a loading range of the biasing member 50. In particular, the loading range includes a seated load of the biasing member 50, where the biasing member 50 is seated in the steering system 10. In one embodiment, the seated load is about 300 N. The loading range also includes a compression load, which represents where the biasing member 50 has bottomed out or is substantially completely compressed between the rack shoe 38 and the lower cam 52. In one embodiment, the biasing member 50 is completely compressed at about 1000N. However, it is to be understood that other values for the seated load and the compression load may be used as well, and may vary based on the specific application.

The load displacement graph also includes a compliance range 106. The compliance range 106 is within the loading range, and is greater than the displacement requirement region 94. The compliance range 106 represents a target load that the biasing member 50 exerts on the rack 22 and the pinion shaft 20 during operation of the steering gear assembly 10. The target load creates a targeted or desired amount of friction between the rack 22 and pinion shaft 20 during operation.

Turning back to FIG. 2, the lower cam 52 and the adjuster plug 54 both receive the torsion biasing member 56. The torsion biasing member 56 may be a torsion spring. In the embodiment as shown in FIG. 2, a first end 110 of the torsion biasing member 56 is received by a recess 112 in the lower cam 52, and a second end 114 is received by a recess 116 in the adjuster plug 54. The torsion biasing member 56 selectively urges the lower cam 52 towards the rack shoe 38 (FIG. 1) through an interaction of camming surfaces 107 located on the lower cam 52 and camming surfaces 108 located on the adjuster plug 54.

Figure 4:
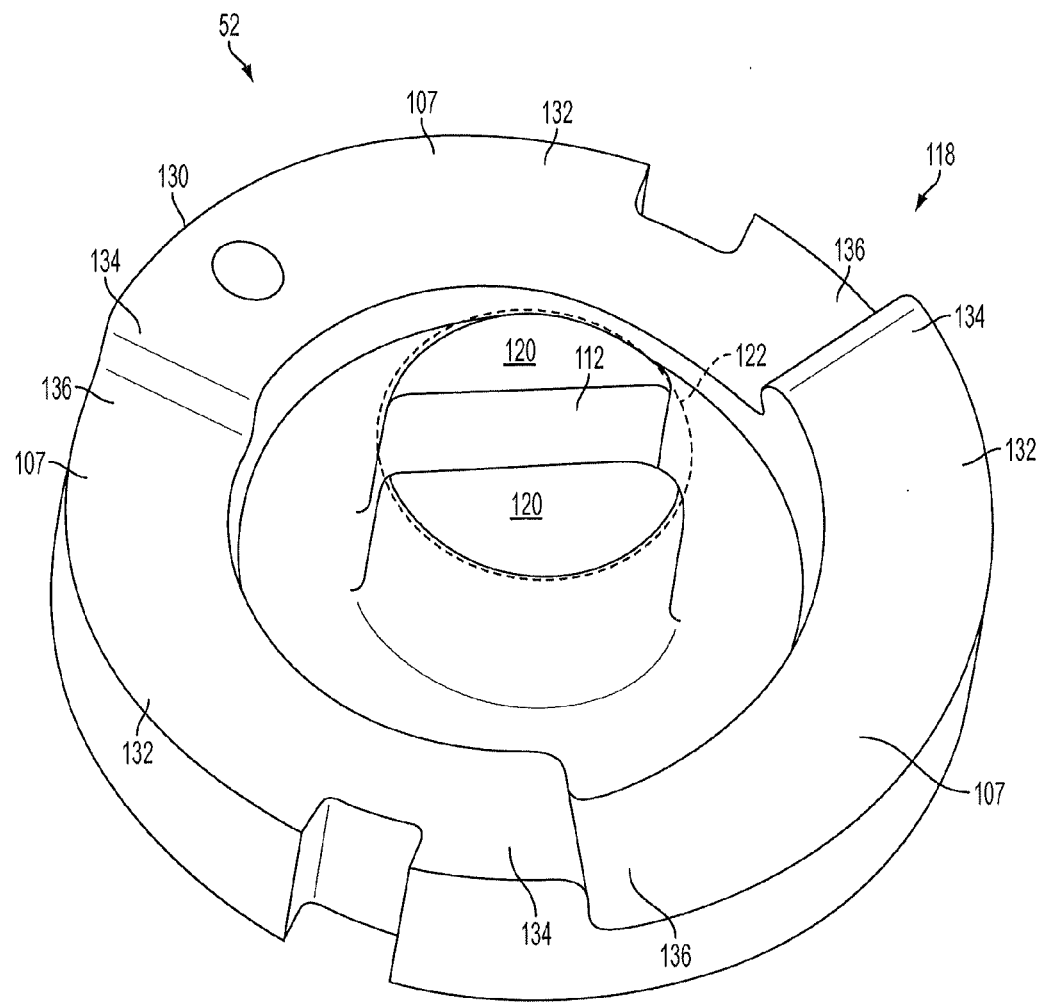
FIG. 4 is an illustration of a lower cam shown in FIG. 2 in accordance with another embodiment of the invention.

Turning now to FIG. 4, an interior portion 118 of the lower cam 52 is illustrated. The recess 112 in the lower cam 52 is defined by two semi-circular protrusions 120, where the torsion biasing member 56 (FIG. 2) wraps around a circumference 122 created by the two semi-circular protrusions 120. The interior portion 118 of the lower cam 52 also includes three inclined camming surfaces 107 that each extend about 120 degrees along an outer perimeter 130 of the lower cam 52. The camming surfaces 107 each include an inclined surface 132, a step surface 134, and a trailing edge 136. In one embodiment, the lower cam 52 may be manufactured by an approach such as, for example, powder metallurgy or die casting.

Figure 5:
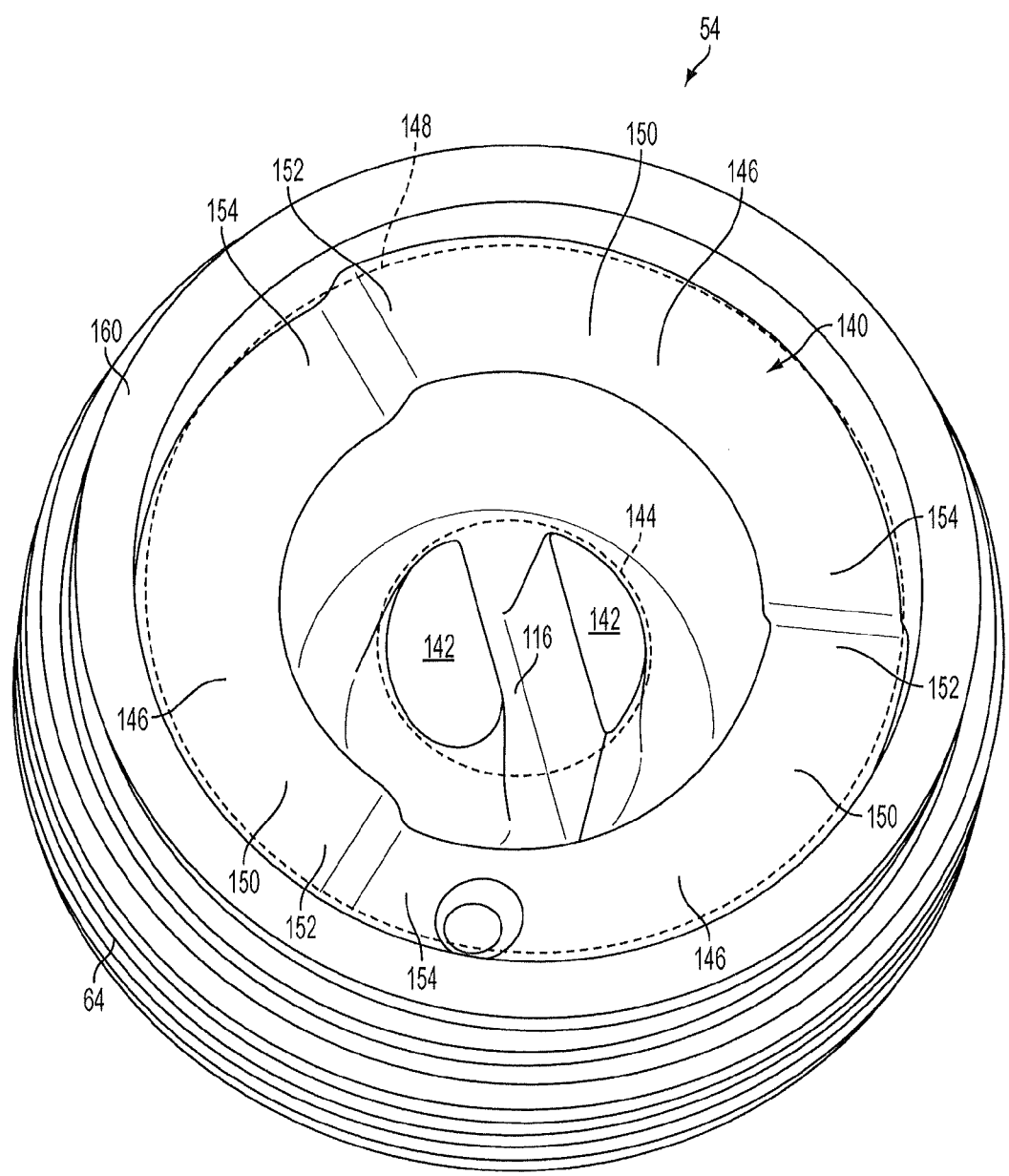
FIG. 5 is an illustration of an adjuster plug shown in FIG. 2 in accordance with yet another embodiment of the invention.

FIG. 5 shows an interior portion 140 of the adjuster plug 54. The adjuster plug 54 includes an outer portion 160 that includes the threads 64 (which allows the adjuster plug 54 to threadingly engage with the threads 66 of the housing 28 shown in FIG. 1). The interior portion 140 is received by and may rotate within the outer portion 160 of the adjuster plug 54. The recess 116 in the interior portion 140 of the adjuster plug 54 is also defined by two semi-circular protrusions 142, where the torsion biasing member 56 (FIG. 2) wraps around a circumference 144 created by the two semi-circular protrusions 142. The interior portion 140 of the adjuster plug 54 also includes three inclined camming surfaces 146 that each extend about 120 degrees along a perimeter 148 of the adjuster plug 54. The camming surfaces 146 each include an inclined surface 150, a step surface 152, and a trailing edge 154.

Referring now to FIGS. 2 and 4-5, during assembly the camming surfaces 107 of the lower cam 52 are engaged with the camming surfaces 146 of the adjuster plug 54. Specifically, the camming surfaces 107 of the lower cam 52 are engaged with the camming surfaces 146 of the adjuster plug 54, where the step surfaces 134 of the lower cam 52 (FIG. 4) are positioned adjacent and abut against the trailing edges 154 of the adjuster plug 54 (FIG. 5), and the step surfaces 152 of the adjuster plug 54 are positioned adjacent and abut against the trailing edges 136 of the lower cam 52. The torsion biasing member 56 exerts a torsional force that selectively urges the interior portion 140 of the adjuster plug 154 to rotate within the outer portion 160. As the interior portion 140 of the adjuster plug 54 rotates, the camming surfaces 146 of the adjuster plug 54 are engaged with and cause the camming surfaces 107 of the lower cam 52 to also rotate with the interior portion 140 of the adjuster plug 54.

Referring now to FIGS. 1-2 and 4-5, during operation of the steering gear assembly 10 (FIG. 1), the pinion shaft 20 and the rack 22 (FIG. 1) may wear. As the pinion shaft 20 and the rack 22 wear, the lower cam 52 may need to be re-positioned towards the pinion shaft 20 so that the biasing member 56 may exert the same biasing force B upon the rack 22 and pinion shaft 20. As the pinion shaft 20 and the rack 22 wear, a resistance to rotational movement of the interior portion 140 within the outer portion 160 of the adjuster plug 54 may decrease. Eventually, the resistance to rotational movement of the interior portion 140 will decrease until the torsional force exerted by the torsional biasing member 56 is greater than the resistance to rotational movement, and the interior portion 140 may rotate within the outer portion 160 of the adjuster plug 54. The rotation of the interior portion 140 of the adjuster plug 54 also rotates the lower cam 52, which in turn moves the lower cam 52 axially towards the pinion shaft 20 and the rack 22. Over time, as the pinion shaft 20 and the rack 22 wear, the amount of compression the biasing member 50 experiences may also decrease. The movement of the lower cam 52 towards the pinion shaft 20 and the rack 22 also further compresses the biasing member 50. The camming surfaces 107 of the lower cam 52, the camming surfaces 146 of the adjuster plug 54, and the torsional biasing member 56 provide a self-adjusting system that accounts for wear in the pinion shaft 20 and the rack 22.

Referring now to FIGS. 1-5, the wear compensator assembly 40 includes the biasing member 50 that exerts the biasing force B for urging the rack teeth 26 of the rack 22 into engagement with the pinion teeth 24 of the pinion shaft 20. Some types of wear compensator assemblies currently available may need to be pre-loaded. For example, some biasing members may need to be compressed against a compression plate prior to the wear compensator assembly being assembled within a housing of the steering system. In contrast, the biasing member 50 as described above does not require a pre-loading operation.

Moreover, some types of wear compensator assemblies may include numerous parts. The wear compensator assembly 40 as described above results in fewer parts when compared to some types of wear compensator assemblies currently available, which in turn may reduce cost and complexity of the steering system 10. For example, some types of wear compensators currently available include a compression plate as well as a nut to pre-load the spring. The wear compensator assembly 40 as described above does not require the compression plate and nut. Some types of wear compensator assemblies may also include a separate adjuster plug and upper cam. The adjuster plug 54 as described above combines the current adjuster plug and the upper cam into one part, thereby reducing the overall number of parts in the wear compensator assembly 40. Also, some types of lower cams currently available may be manufactured using a relatively expensive process such as, for example, metal injection molding. This is because the lower cam generally needs threading for securing the nut and the compression plate. In contrast, the lower cam 52 as described above does not generally need threads, and therefore may be manufactured by a relatively less expensive approach such as, for example, powder metallurgy or die casting.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A wear compensator assembly for exerting a predetermined biasing force on a rack and a pinion shaft of a steering gear assembly, comprising:
   a cam member having
      a seating surface that engages a rack shoe seating surface disposed between the cam member and the rack, and
      a protrusion formed integrally with the cam member and projecting outwardly from the seating surface;
   an adjuster plug having an opening that partially receives a portion of the cam member, the protrusion extending beyond the adjuster plug and into and not engaging the rack shoe; and
   a biasing member seated against and disposed between the seating surface of the cam member and the rack shoe seating surface, the biasing member having an aperture that receives the protrusion, the biasing member configured to be compressed by a predetermined amount between the seating surface and the rack shoe seating surface and exert the predetermined biasing force.

2. The wear compensator assembly of claim 1, wherein the biasing member has specific load displacement characteristics, and wherein the specific load displacement characteristics include a compliance range that represents a target load that the biasing member exerts during operation of the steering gear assembly.

3. The wear compensator assembly of claim 1, wherein the biasing member has specific load displacement characteristics, and the specific load displacement characteristics include a displacement requirement region that represents a target amount of compression the biasing member experiences based on the biasing member being assembled to the steering gear assembly.

4. The wear compensator assembly of claim 1, wherein the biasing member is seated at about 300 Newtons, and wherein the biasing member is substantially completely compressed at about 1000 Newtons.

5. The wear compensator assembly of claim 1, wherein the adjuster plug includes at least one adjuster plug camming surface that is engaged with at least one camming surface of the cam member.

6. The wear compensator assembly of claim 5, further comprising a housing, wherein the adjuster plug is threadingly engaged with the housing.

7. The wear compensator assembly of claim 6, wherein the adjuster plug is mechanically staked to the housing.

8. The wear compensator assembly of claim 5, further comprising an O-ring, wherein the adjuster plug include a recess for receiving the O-ring.

9. A steering gear assembly, comprising:
a rack;
a pinion shaft;
a rack shoe having a rack shoe seating surface, the rack shoe seated against the rack;
a wear compensator assembly configured for exerting a predetermined biasing force on the rack and the pinion shaft, comprising:
a cam member having a cam seating surface and a protrusion integrally formed with the cam member and projecting outwardly from the cam seating surface and received within and not engaging the rack shoe, the cam member defining a first recess,
an adjuster plug having an opening that surrounds the cam member, the adjuster plug defining a second recess,
a torsion biasing member having a first end received within the first recess and having a second end received within the second recess, the torsion biasing member selectively urges the cam member towards the rack shoe; and
a biasing member having an aperture that receives the protrusion, the biasing member compressed by a predetermined amount between the cam seating surface of the cam member and the rack shoe seating surface, the biasing member configured to exert the predetermined biasing force on the rack shoe.

10. The steering gear assembly of claim 9, wherein the biasing member has specific load displacement characteristics, and wherein the specific load displacement characteristics include a compliance range that represents a target load that the biasing member exerts during operation of the steering gear assembly.

11. The steering gear assembly of claim 9, wherein the biasing member has specific load displacement characteristics, and the specific load displacement characteristics include a displacement requirement region that represents a target amount of compression the biasing member experiences based on the biasing member being assembled to the steering gear assembly.

12. The steering gear assembly of claim 9, wherein the biasing member is seated at about 300 Newtons, and wherein the biasing member is substantially completely compressed at about 1000 Newtons.

13. The steering gear assembly of claim 9, wherein the adjuster plug includes at least one adjuster plug camming surface that is engaged with at least one camming surface of the cam member.

14. The steering gear assembly of claim 13, further comprising a housing, wherein the adjuster plug is threadingly engaged with the housing.

15. The steering gear assembly of claim 14, wherein the adjuster plug is mechanically staked to the housing.

16. The steering gear assembly of claim 15, further comprising an O-ring, wherein the adjuster plug include a recess for receiving the O-ring.

17. The steering gear assembly of claim 9, wherein the biasing member includes an opening and the cam member includes a protrusion projecting outwardly from the seating surface, wherein the opening of the biasing member is received by the protrusion.

18. A steering gear assembly, comprising:
a rack;
a pinion shaft;
a rack shoe having a rack shoe seating surface, the rack shoe seated against the rack;
a wear compensator assembly configured for exerting a predetermined biasing force on the rack and the pinion shaft, comprising:
a cam member having a cam seating surface, a protrusion integrally formed with the cam member and projecting outwardly from the cam seating surface, a first recess, a first cavity disposed about and concentric with the first recess, and at least one camming surface that includes a first inclined surface, a first step surface, and a first trailing edge;
an adjuster plug having an opening that surrounds the cam member, a second recess proximately aligned with the first recess, a second cavity disposed about and concentric with the second recess, and at least one adjuster plug camming surface that includes a second inclined surface, a second step surface, and a second trailing edge, the first step surface abuts the second trailing edge and the second step surface abuts the first trailing edge;
a torsion biasing member received within the first cavity and the second cavity, the torsion biasing member having a first end received within the first recess and having a second end received within the second recess; and
a biasing member having an aperture that receives the protrusion, the biasing member compressed by a predetermined amount between the cam seating surface of the cam member and the rack shoe seating surface, the biasing member configured to exert the predetermined biasing force on the rack shoe.

19. The steering gear assembly of claim 18, wherein the biasing member has specific load displacement characteristics, and the specific load displacement characteristics include a compliance range that represents a target load that the biasing member exerts during operation of the steering gear assembly.

* * * * *